US009248599B2

(12) United States Patent
Chen et al.

(10) Patent No.: US 9,248,599 B2
(45) Date of Patent: Feb. 2, 2016

(54) HIGH IMPACT POLYMER INTERLAYERS (71) Applicant: Solutia Inc., St. Louis, MO (US)

(72) Inventors: Wenjie Chen, Amherst, MA (US); Aristotelis Karagiannis, Amherst, MA (US)

(73) Assignee: Solutia Inc., Saint Louis, MO (US)

( * ) Notice: Subject to any disclaimer, the term of this patent is extended or adjusted under 35 U.S.C. 154(b) by 414 days.

(21) Appl. No.: 13/683,552

(22) Filed: Nov. 21, 2012

(65) Prior Publication Data

US 2013/0075949 A1  Mar. 28, 2013

Related U.S. Application Data (62) Division of application No. 11/742,547, filed on Apr. 30, 2007, now abandoned.

(51) Int. Cl.
| | |
|---|---|
| *B29C 47/06* | (2006.01) |
| *B32B 17/10* | (2006.01) |
| *B32B 27/30* | (2006.01) |
| *C08K 5/00* | (2006.01) |
| *B29C 47/00* | (2006.01) |

(52) U.S. Cl.
CPC ............. *B29C 47/06* (2013.01); *B29C 47/0021* (2013.01); *B32B 17/10761* (2013.01); *B32B 27/30* (2013.01); *C08K 5/0016* (2013.01); *Y10T 428/31913* (2015.04)

(58) Field of Classification Search
CPC .................................................... B29C 47/065
USPC ..................................................... 264/173.16
See application file for complete search history.

(56) References Cited

U.S. PATENT DOCUMENTS

| | | | |
|---|---|---|---|
| 3,920,878 | A | 11/1975 | Fariss et al. |
| 4,230,771 | A | 10/1980 | Phillips |
| 4,436,784 | A | 3/1984 | Ehrhart |
| 5,340,654 | A | 8/1994 | Ueda et al. |
| 5,560,149 | A | 10/1996 | Lafevre |
| 5,713,167 | A | 2/1998 | Durham et al. |
| 5,766,755 | A | 6/1998 | Chaussade et al. |
| 5,853,828 | A | 12/1998 | Schimmelpenningh et al. |
| 5,853,835 | A | 12/1998 | Leniton |
| 5,960,606 | A | 10/1999 | Dlubak |
| 6,237,306 | B1 | 5/2001 | Dlubak |

(Continued)

FOREIGN PATENT DOCUMENTS

| | | |
|---|---|---|
| JP | 2005289038 A | 10/2005 |
| WO | 2008137367 A2 | 11/2008 |

OTHER PUBLICATIONS

International Search Report, International Patent Application No. PCT/US2008/061690, mailed on Aug. 13, 2009, 4 pages.

*Primary Examiner* — Timothy Kennedy
(74) *Attorney, Agent, or Firm* — Michelle Bugbee (57) ABSTRACT Multiple poly(vinyl butyral) layer interlayers that can be used in multiple layer glass panel type applications that require a high level of impact protection, for example in hurricane protection applications or in bullet proof glass applications. This effect is achieved by forming a poly(vinyl butyral) interlayer that has a relatively stiff poly(vinyl butyral) inner layer disposed between two relatively soft outer poly(vinyl butyral) layers, where the stiffness difference is achieved by a plasticizer differential that is achieved at least in substantial part by a residual hydroxyl content difference among the poly(vinyl butyral) layers.

16 Claims, 2 Drawing Sheets (56) References Cited

U.S. PATENT DOCUMENTS

| | | | |
|---|---|---|---|
| 6,401,428 B1 | 6/2002 | Glover et al. |
| 6,564,517 B1 | 5/2003 | Hanssen |
| 6,675,550 B1 | 1/2004 | Dlubak |
| 6,715,245 B2 | 4/2004 | Lewkowitz |
| 6,868,648 B2 | 3/2005 | Glover et al. |
| 7,138,166 B2 | 11/2006 | Rinehart et al. |
| 7,189,457 B2 | 3/2007 | Anderson |
| 2001/0046595 A1 | 11/2001 | Moran et al. |
| 2002/0061395 A1 | 5/2002 | Moran et al. |
| 2003/0124296 A1 | 7/2003 | Smith |
| 2003/0188498 A1 | 10/2003 | Lewkowitz |
| 2004/0221526 A1 | 11/2004 | Rinehart et al. |
| 2004/0234731 A1 | 11/2004 | Rinehart et al. |
| 2005/0106372 A1 | 5/2005 | Moran et al. |
| 2005/0118445 A1 | 6/2005 | Wong et al. |
| 2005/0170160 A1 | 8/2005 | Moran et al. |
| 2005/0202264 A1 | 9/2005 | Smith et al. |
| 2005/0266187 A1 | 12/2005 | Smith et al. |
| 2006/0063007 A1 | 3/2006 | Anderson |
| 2006/0182983 A1 | 8/2006 | Paul et al. |
| 2006/0210782 A1 | 9/2006 | Lu |
| 2007/0014976 A1 | 1/2007 | Matsudo |
| 2007/0065629 A1 | 3/2007 | Rinehart et al. |

HIGH IMPACT POLYMER INTERLAYERS

CROSS REFERENCE TO RELATED APPLICATION(S)

This Application is a Divisional of U.S. Utility patent application Ser. No. 11/742,547, filed Apr. 30, 2007 and currently pending, the entire disclosure of which is incorporated herein by reference.

BACKGROUND OF THE INVENTION

1. Field of the Invention

The present invention is in the field of polymer interlayers and multiple layer glass panels comprising polymer interlayers, and, more specifically, the present invention is in the field of polymer interlayers comprising multiple thermoplastic layers

2. Description of Related Art

Poly(vinyl butyral) (PVB) is commonly used in the manufacture of polymer layers that can be used as interlayers in light-transmitting laminates such as safety glass or polymeric laminates. Safety glass often refers to a transparent laminate comprising a poly(vinyl butyral) layer disposed between two layers of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

Safety glass is particularly desirable in architectural glazing applications that are intended for use in areas prone to hurricane activity. During hurricanes, wind-borne debris will be present. To protect a building during hurricane from being damaged, windows and doors, typically the weakest link in a building's envelope, must be safeguarded from penetration by wind-borne debris, and they must also remain in the place through the remainder of the storm. Therefore, an interlayer that can safeguard a window against significant impacts and remain in the opening during cyclical wind loading even if the glass is cracked is particularly desirable.

Attempts to create such an interlayer for hurricane protection have usually involved balancing the benefit to high impact resistance obtained from using a relatively softer and lower glass adhesion polymeric interlayer with the benefit of high cyclical wind loading resistance after glass cracking which is obtained from using a stiffer and high glass adhesion polymeric interlayer.

If an interlayer is too soft or adhesion to glass is too low, then the interlayer will not have the strength to resist high wind loading after an impact. On the other hand, if the interlayer is too stiff and adhesion to glass is too high, then the interlayer will not have a high level of impact resistance—i.e., the interlayer will have low penetration resistance.

Therefore, further improved interlayer compositions are needed to provide multiple layer safety glass that has high impact resistance and high cyclical wind-loading resistance for, among other things, hurricane protection.

SUMMARY

The present invention provides multiple poly(vinyl butyral) layer interlayers that can be used in multiple layer glass panel type applications that require a high level of impact protection, for example in hurricane protection applications or in bullet proof glass applications. This effect is achieved by forming a poly(vinyl butyral) interlayer that has a relatively stiff poly(vinyl butyral) inner layer disposed between two relatively soft outer poly(vinyl butyral) layers, where the, stiffness difference is achieved by a plasticizer differential that is achieved at least in substantial part by a residual hydroxyl content difference among the poly(vinyl butyral) layers.

DETAILED DESCRIPTION OF PREFERRED EMBODIMENTS

According to the present invention, it has now been surprisingly discovered that superior impact resistance and high stiffness characteristics can be imparted on multiple layer glazing panels by incorporating a multiple layer interlayer into the panels, where the interlayer comprises three poly (vinyl butyral) layers having different plasticizer concentrations that are stably achieved by formulating the poly(vinyl butyral) layers with different levels of residual hydroxyl content.

The composition of the poly(vinyl butyral) layers is such that net migration of plasticizer from one poly(vinyl butyral) layer to another is negligible or zero, thereby maintaining the plasticizer differential.

As used herein, "plasticizer content" can be measured as parts per hundred resin parts (phr), on a weight per weight basis. For example, if 30 grams of plasticizer is added to 100 grams of polymer resin, then the plasticizer content of the resulting plasticized polymer would be 30 phr. As used herein throughout, when the plasticizer content of a polymer layer is given, the plasticizer content of that particular layer is determined with reference to the phr of the plasticizer in the melt that was used to produce that particular layer.

For layers of unknown plasticizer content, the plasticizer content can be determined via a wet chemical method in which an appropriate solvent, or a mixture of solvents, is used to extract the plasticizer out of the layer. By knowing the weight of the sample layer and the weight of the extracted layer, the plasticizer content in phr can be calculated. In the ease of a multiple polymer layer interlayer, individual polymer layers can be physically separated from one another before the plasticizer content in each of the polymer layers is measured.

In various embodiments of the present invention, a multiple layer interlayer that imparts superior impact resistance and high stiffness characteristics on multiple layer glass panels comprises three polymer layers having different stiffness. The stiffness of the two skin layers can be the same or different.

As used herein, an "interlayer" is any thermoplastic construct that can be used in multiple layer glass applications, such as safety glass in windshields and architectural windows, and a "multiple layer" interlayer is any interlayer that is formed by combining, usually through laminating processes or coextrusion, two or more individual layers into a single interlayer.

In various embodiments of the present invention, a multiple layer interlayer comprises three polymer layers disposed in contact with each other, wherein each polymer layer comprises a thermoplastic polymer, as detailed elsewhere herein.

In preferred embodiments of the present invention, three layer interlayers of the present invention have two outer poly(vinyl butyral) layers and an inner poly(vinyl butyral) layer, with the outer layers having relatively high plasticizer content and low residual hydroxyl content (as detailed elsewhere herein), and the inner layer having a relatively low plasticizer content and high residual hydroxyl content.

For a given type of plasticizer, the compatibility of that plasticizer in poly(vinyl butyral) is largely determined by the residual hydroxyl content or vinyl acetate content. Typically, poly(vinyl butyral) with a greater residual hydroxyl content or vinyl acetate content will have different compatibility or capacity with the given plasticizer from poly(vinyl butyral) with a lower residual hydroxyl content and vinyl acetate content. These properties can be used to select the hydroxyl or vinyl acetate content of each poly(vinyl butyral) polymer and formulate each of the polymer layers to allow for the proper plasticizer loading and to stably maintain the difference in plasticizer content between the polymer layers.

In various embodiments of the present invention, the plasticizer content of the outer layers are each at least 2 phr, 5 phr, 8 phr, 10 phr, 12 phr, 15 phr, 18 phr, 20 phr, or 25 phr greater than the plasticizer content of the inner polymer layer. The outer layers can have, for example, 10-75 phr plasticizer, while the inner layer can have, for example, 0-50 phr plasticizer. As noted above, the plasticizer difference between the layers is maintained in the final laminate or coextruded interlayer due to the difference in residual hydroxyl content or vinyl acetate content.

As used herein, residual hydroxyl content (as vinyl hydroxyl content or poly(vinyl alcohol) (PVOH) content) refers to the amount of hydroxyl groups remaining as side groups on the polymer chains after processing is complete. For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl alcohol groups) as side groups on the polymer chain. As used herein, residual hydroxyl content is measured on a weight percent basis per ASTM 1396.

In various embodiments of the present invention, the residual hydroxyl content of the inner polymer layer can be at least 0.5%, 1.5%, 1.8%, 2.0%, 2.2%, 2.5%, 3.0%, 4.0%, 5.0%, 7.5%, or at least 10% greater than the residual hydroxyl content of the two outer polymer layers. This difference is calculated by subtracting the residual hydroxyl content of the layer with the lower residual hydroxyl content from the residual hydroxyl content of the layer with the greater residual hydroxyl content. For example, if the middle polymer layer has a residual hydroxyl content of 20%, and an outer polymer layer has a residual hydroxyl content of 17%, then the residual hydroxyl content of the middle layer is 3% greater than the residual hydroxyl content of the outer layer.

As is known in the art, residual hydroxyl content in poly(vinyl butyral) resin can be controlled by controlling butyraldehyde concentration, reaction times, and other variables in the manufacturing process. In various embodiments, the residual hydroxyl content of the layers is as follows: middle layer less than 30% and outer layers less than 28%; middle layer less than 25% and outer layers less than 23%; middle layer less than 23% and outer layers less than 21%; middle layer less than 21% and outer layers less than 19%; middle layer less than 21% and outer layer less than 17%; middle layer less than 21% and out layer less than 15%; middle layer less than 21% and out layer less than 12%; middle layer less than 20% and outer layers less than 17%; middle layer less than 18% and outer layers less than 15%; and middle layer less than 15% and outer layers less than 12%. In any of these embodiments, any suitable values given in the paragraph, above, for the difference in hydroxyl content between the layers can be used.

As used herein, tensile break stress, or tensile strength, of a polymer layer is defined and measured according to the method described in JIS K6771. In various embodiments of the present invention, the polymer layers have a tensile break stress according to the following, wherein the middle polymer layer in the following list is the polymer layer with the lower plasticizer content: middle polymer layer greater than 135 kilograms per square centimeter and outer polymer layers less than 120 kilograms per square centimeter; middle polymer layer greater than 150 kilograms per square centimeter and outer polymer layers less than 135 kilograms per square centimeter; middle polymer layer greater than 165 kilograms per square centimeter and outer polymer layers less than 150 kilograms per square centimeter; middle polymer layer greater than 180 kilograms per square centimeter and outer polymer layers less than 165 kilograms per square centimeter; or middle polymer layer greater than 350 kilograms per square centimeter and outer polymer layer less than 100 kilograms per square centimeter; or in general the two polymer layers differ in tensile break stress by at least 15 kilograms per square centimeter. In yet other embodiments, the tensile break stress of the middle polymer layer is greater than 230 kilograms per square centimeter, and the tensile break stress of the outer polymer layers is less than 230 kilograms per square centimeter.

In various embodiments of the present invention, two adjacent polymer layers of the present invention have the differing plasticizer content and residual hydroxyl content, as described above, and each further has a residual acetate content of less than 5 mole %, less than 4 mole %, less than 3 mole %, less than 2 mole %, or less than 1 mole %. These residual acetate concentrations can be combined with the residual hydroxyl contents given above, in any combination, to form polymer layers of the present invention having the described differences in plasticizer content and residual hydroxyl content while having little to no residual acetate content.

In the three layer embodiments of the present invention, the outer two layers can have the same or different compositions. For example, one outer polymer layer can have a 10 phr plasticizer difference with the middle polymer layer, while the second outer polymer layer can have a 20 phr plasticizer difference with the middle polymer layer. Such a difference would be useful, for example and without limitation, in embodiments in which the two rigid glazing substrates between which the multiple layer interlayer is being laminated are different or have different surface treatments.

In addition to the three layer embodiments described herein, further embodiments include interlayers having more than three layers. For example, any of the three polymer layers in the three layer embodiment can be substituted with multiple thinner polymer layers that together have the approximate thickness of the single polymer layer. Such a construction would be desirable, for example and without limitation, if a modifying agent, such as an ultraviolet light absorber, was required in only a thin cross section of the interlayer. In addition to polymer layers, polymer films, as described below, can also be added, as desired. For example, a polymer film can be added between the middle polymer layer and an outer polymer layer in the three layer embodiment to provide a desired function, such as infrared blocking Interlayers of the present invention can have, for example, 4, 5, 6, or up to 10 individual layers.

Other conventional layers, as are known in the art, can be incorporated into the interlayers of the present invention. For example, polymer films (described in detail elsewhere herein) such as polyesters like poly(ethylene terephthalate) having a metallized layer, an infrared reflecting stack, or other performance layer deposited thereon, can be included between any two layers of polymer layers of the present invention. In general, additional layers of thermoplastics, such as poly (vinyl butyral), polyester films, primer layers, and hardcoat layers can be added to the multiple layer interlayers of the present invention according to the desired result and the particular application.

In addition to methods of manufacturing multiple layer interlayers of the present invention and multiple layer glazings comprising those interlayers in which the interlayers have been produced by combining individual layers that already have the desired differences in plasticizer content, methods of the present invention also include the technique of combining layers having plasticizer contents that are the same or closer together than in the final product. For example, a prelaminate can be formed having outer polymer layers with 30 phr plasticizer and an inner polymer layer with 30 phr plasticizer, with the inner polymer layer having a higher residual hydroxyl content than the outer polymer layers, as detailed elsewhere herein. The prelaminate, which has not been completely laminated, will be easier to handle than would be the case if the outer layers had a higher plasticizer content. After final lamination, plasticizer will migrate from the inner polymer layer to the outer polymer layers until an equilibrium is reached, at which point the desired plasticizer differential will have been reached. In various embodiments of this method of the present invention, plasticizer content of the inner polymer layer, relative to the outer polymer layers, at the time of lamination of the layers can be the same, with a subsequent migration in plasticizer content resulting in the desired differential. In various embodiments, the plasticizer content, in terms of phr, of the inner layer can decrease up to 5% or up to 10% of its initial value because of migration of plasticizer between the layers after lamination.

The present invention also includes methods of manufacturing an interlayer, comprising the steps of forming a first polymer layer, a second polymer layer, and a third polymer layer, wherein the three polymer layers have compositions according to the three layer embodiments as described elsewhere herein, and laminating the three polymer layers together to form the interlayer.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows and doors, comprising a multiple layer interlayer of the present invention.

Also included are multiple layer glazing panels having plastics, such as acrylics, or other suitable materials in place of the glass panels.

Polymer Film

As used herein, a "polymer film" means a relatively thin and rigid polymer layer that functions as a performance enhancing layer. Polymer films differ from polymer layers, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer layer. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and copoly(ethylene terephthalate) (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly (ethylene terephthalate) film that can be used with the present invention are disclosed in published European Application No. 0157030. Polymer films of the present invention can also include a hardcoat and/or and antifog layer, as are known in the art.

Polymer Layer

As used herein, a "polymer layer" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

The polymer layer can comprise any suitable polymer, and, in a preferred embodiment, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives disclosed herein can be used with the polymer layer having a polymer consisting of or consisting essentially of poly(vinyl butyral).

In one embodiment, the polymer layer comprises a polymer based on partially acetalized poly(vinyl alcohol)s. In another embodiment, the polymer layer comprises a polymer selected from the group consisting of poly(vinyl butyral), polyurethane, polyvinyl chloride, poly(ethylene vinyl acetate), combinations thereof, and the like. In other embodiments, the polymer layer comprises plasticized poly(vinyl butyral). In further embodiments the polymer layer comprises poly(vinyl butyral) and one or more other polymers. Other polymers having a proper plasticizing capacity can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer layers.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that in various embodiments, residual hydroxyl content will be controlled, as described elsewhere herein.

In various embodiments, the polymer layer comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight.

If additional, conventional polymer layers are used in addition to any of the embodiments described above as having residual hydroxyl and plasticizer content differences, those additional, conventional polymer layers can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethylhexanoate).

Adhesion control agents (ACAs) can also be included in the polymer layers of the present invention to impart the desired adhesiveness. These agents can be incorporated into the outer layers in a three polymer layer embodiment, for example. Any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer layers of the present invention comprise, in addition to sodium acetate, magnesium bis(2-ethyl butyrate)(chemical abstracts number 79992-76-0). The magnesium salt can be included in an amount effective to control adhesion of the polymer layer to glass.

Additives may be incorporated into the polymer layer to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer layers. Agents that can be used include dyes and pigments such as indium tin oxide, antimony tin oxide, or lanthanum hexaboride ($LaB_6$).

Any suitable method can be used to produce the polymer layers and the multiple layer interlayers of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet. In either embodiment, the surface texture at either or both sides of the layer may be controlled by adjusting the surfaces of the die opening to control melt fracture or by providing texture at the roller surface. Other techniques for controlling the layer texture include varying parameters of the materials (for example, the water content of the resin and/or the plasticizer, the melt temperature, molecular weight distribution of the poly(vinyl butyral), or combinations of the foregoing parameters). Furthermore, the layer can be configured to include spaced projections that define a temporary surface irregularity to facilitate the de-airing of the layer during lamination processes after which the elevated temperatures and pressures of the laminating process cause the projections to melt into the layer, thereby resulting in a smooth finish.

Manufacture of the interlayers of the present invention can be by any suitable process, for example, by lamination of individual layers or through coextrusion.

Lamination of individual layers can be performed by combining separately produced layers and then applying sufficient heat and pressure to tack the layers together to form a "prelaminate," thereby allowing the handling of the layers as a unit, with final adhesion occurring later when the interlayer is laminated between rigid glazing substrates. Alternatively, individual layers can be assembled and positioned between rigid glazing substrates without any prior tacking, and the complete multiple layer glazing can be laminated in a single step.

The preferred method of producing interlayers of the present invention is through the simultaneous coextrusion of multiple, for example three, polymer layers. For the purposes of the present invention, coextrusion of multiple melts results in multiple polymer layers being formed together as one interlayer.

Figure 1:
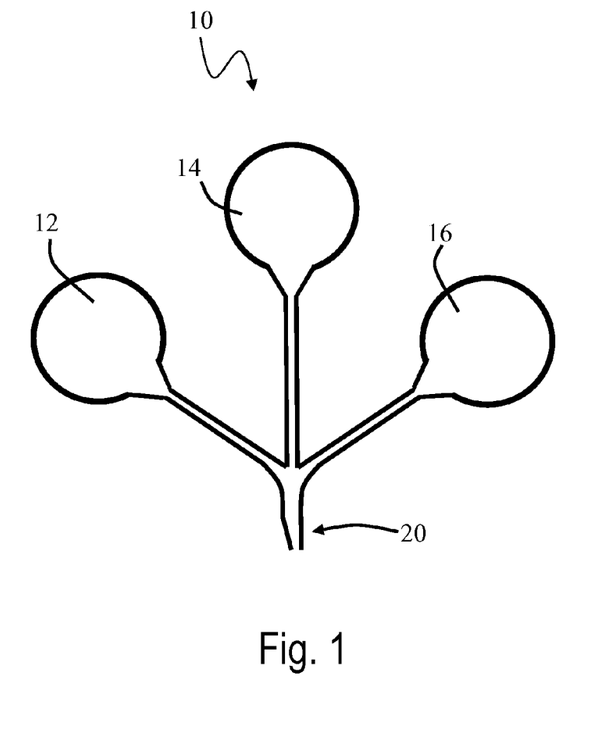
FIG. 1 represents a schematic cross sectional view of a multiple manifold coextrusion device of the present invention.

Multiple layer interlayers of the present invention are preferably coextruded using a multiple manifold coextrusion device such as the one shown in FIG. 1. As shown in schematic cross sectional view generally at 10, an extrusion device has a first die manifold 12, a second die manifold 14, and a third die manifold 16. The device shown in FIG. 1 operates by simultaneously extruding polymer melts from each manifold (12, 14, 16) toward the extrusion opening 20, where the multiple layer interlayer is extruded as a composite of three individual polymer layers. Layer thickness can be varied by adjusting the distance between the die lips at the extrusion opening 20.

As used herein, a "polymer layer" includes layers that are produced individually and layers that are coextruded. For example, an interlayer that is produced by coextruding three melts will have three individual "polymer layers" just as will an interlayer that is produced by laminating three individually produced polymer layers into a single interlayer.

In various embodiments, the interlayers of the present invention can have total thicknesses of 0.1 to 3 millimeters, 0.2 to 2.5 millimeters, 0.25 to 1.75 millimeters, and 0.3 to 1.5 millimeters (mm). The individual polymer layers of a multiple layer interlayer can have, for example, approximately equal thicknesses that, when added together, result in the total thickness ranges given above. Of course, in other embodiments, the thicknesses of the layers can be different, and can still add to the total thicknesses given above.

The parameters for the polymer layer described above apply as well to any layer in a multiple layer construct of the present invention that is a poly(vinyl butyral) type layer.

The following paragraphs describe various techniques that can be used to improve and/or measure the characteristics of the polymer layer.

The clarity of a polymer layer, and particularly a poly(vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR 30 spectrophotometer such as the Lambda 900 made by Perkin Elmer Corp. by methods described in international standard ISO 9050:1990. In various embodiments, the transmittance through a polymer layer of the present invention is at least 60%, at least 70%, or at least 80%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −18° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 2 and 10.

Tensile break stress can be determined for a polymer layer according to the procedure described in JIS K6771.

Impact testing is carried out using a staircase method "ball drop" test to determine the impact resistance of the laminated glass panel comprising the interlayer. A 2,268 gram steel ball is dropped vertically onto a horizontally positioned, 30.5 cm×30.5 cm size of the sample panel to be tested. Impact performance is measured as the Mean Break Height (MBH), which is calculated as the ball drop height at which 50% of the samples would hold the ball and 50% would allow penetration.

Flexural Modulus is determined according to ASTM D790.

EXAMPLES

Figure 2:
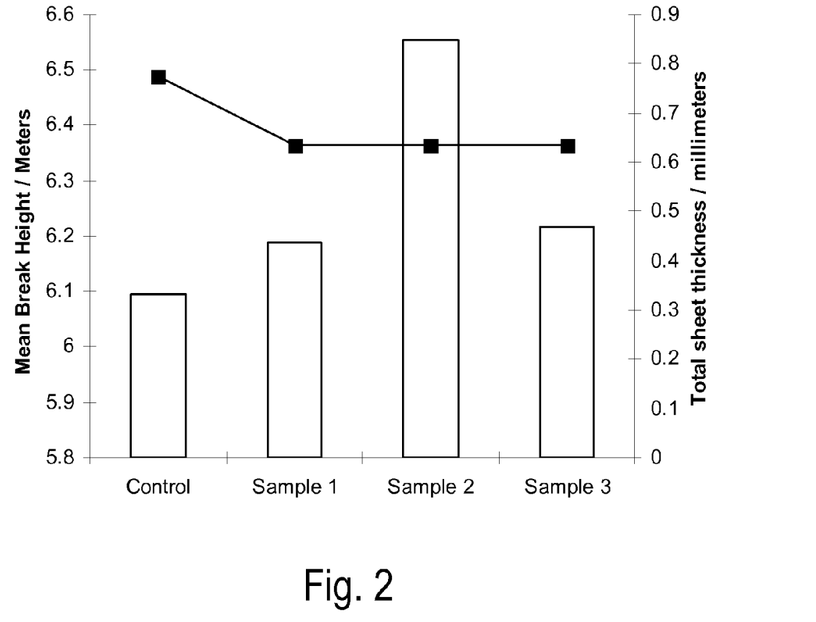
FIG. 2 is a graph showing the results of a ball drop impact test for three sample interlayer embodiments of the present invention and a control interlayer.

Impact Resistance:

Examples of the poly(vinyl butyral) multiple layer interlayers having improved impact resistance are listed in Table 1. The impact resistance, shown as the Mean Break Height (MBH) in the unit of meters, is illustrated in FIG. 2.

For the three Samples given in Table 1, each sample interlayer has a total thickness of 0.64 millimeters (25 mil) comprising a first layer and a third layer each having 16% residual hydroxyl content and a thickness of 0.10 millimeters (4 mils) with a second layer having 18.5% residual hydroxyl content and a thickness of 0.43 millimeters (17 mils) between and in contact with the first layer and the third layer.

Table 1 provides the phr of the plasticizer triethylene glycol di-(2-ethylhexanoate) (3GEH) formulated with the resin.

TABLE 1

| Sample | phr of plasticizer | | |
|---|---|---|---|
| | Layer 1 | Layer 2 | Layer 3 |
| 1 | 32 | 22 | 32 |
| 2 | 25 | 22 | 25 |
| 3 | 32 | 27 | 32 |

As shown in FIG. 2, the tested multiple layer interlayer embodiments of the present invention demonstrate a higher impact performance at 0.64 millimeter total layer thickness (25 mil), compared with a conventional, single layer interlayer having a thickness of 0.76 millimeters (30 mil).

The stiffness of two sample multiple layer interlayers of the present invention are measured as the Flexural Modulus of a laminated glass panel comprising the sample interlayers. The same thickness of glass is used for both samples and the comparative interlayer, which is 3 millimeters in the present invention. Results are shown in Table 2.

For the two Samples given in Table 2, each sample three layer interlayer has the thicknesses and residual hydroxyl content given in the table, with the first and third outer layers of each having 25 phr of plasticizer triethylene glycol di-(2-ethylhexanoate) (3GEH) formulated with the resin, and the second, inner layer of each having 18 phr of that same plasticizer formulated with the resin. The "Comp" interlayer is a Saflex "Storm" product that is commercially available from Solutia Inc.

TABLE 2

| Sample | Total Thickness millimeters (mils) | Layer Thickness millimeters (mils) | | | Flexural Modulus $10^{10}$ Pa ($10^6$ PSI) |
|---|---|---|---|---|---|
| | | Layer 1 (16% PVOH) | Layer 2 (18.5% PVOH) | Layer 3 (16% PVOH) | |
| 4 | 1.88 (74) | 0.38 (15) | 1.12 (44) | 0.38 (15) | 4.54 (6.59) |
| 5 | 1.32 (52) | 0.38 (15) | 0.56 (22) | 0.38 (15) | 4.63 (6.72) |
| Comp | Total thickness of 2.0 millimeters (77 mil) | | | | 2.32 (3.36) |

The multiple layer interlayer embodiments of the present invention shown in Table 2 demonstrate a higher stiffness than a conventional control sample, where "Pa" is Pascal and "PSI" is pounds per square inch.

By virtue of the present invention, it is now possible to provide multiple layer interlayers that have superior impact resistance and high stiffness, and that are readily incorporated into multiple layer constructs, such as laminated glass panels for architectural windows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising residual acetate content in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

The invention claimed is:

1. A method of making a multiple layer interlayer, comprising:
    forming a first polymer melt, comprising poly(vinyl butyral) and a plasticizer, a second polymer melt comprising poly(vinyl butyral) and a plasticizer, and a third polymer melt comprising poly(vinyl butyral) and a plasticizer, wherein the difference in phr of the plasticizer concentrations between any of said first polymer melt, said second polymer melt, and said third polymer melt is 2 phr or more and wherein the amount of plasticizer in the second polymer melt is less than the amount of plasticizer in at least one of the first polymer melt and the third polymer melt;
    coextruding said first polymer melt, said second polymer melt, and said third polymer melt to form said interlayer having a first polymer layer, a second polymer layer, and a third polymer layer, with said second polymer layer disposed between said first polymer layer and said third polymer layer;
    wherein said second polymer layer has a residual hydroxyl content by weight that is at least 0.5% greater than the residual hydroxyl content by weight of said first polymer layer and said third polymer layer, and
    wherein the tensile break stress of said second polymer layer is more than 15 kilograms per square centimeter greater than the tensile break stress of said first polymer layer and said third polymer layer.

2. The method of claim 1, wherein said second polymer layer has a residual hydroxyl content by weight that is at least 1.0% greater than the residual hydroxyl content by weight in each of said first polymer layer and third polymer layer.

3. The method of claim 1, wherein said second polymer layer has a residual hydroxyl content by weight that is at least 2.0% greater than the residual hydroxyl content by weight in each of said first polymer layer and said third polymer layer.

4. The method of claim 1, wherein the tensile break stress of said second polymer layer is greater than 180 kilograms per square centimeter, the tensile break stress of said first polymer layer and said third polymer layer is less than 230 kilograms per square centimeter, and wherein the tensile break stress of said second polymer layer is more than 15 kilograms per square centimeter greater than the tensile break stress of said first polymer layer and said third polymer layer.

5. The method of claim 1, wherein the difference in phr of the plasticizer concentrations between any of said first polymer melt, said second polymer melt, and said third polymer melt is 5 phr or more.

6. The method of claim 1, wherein the difference in phr of the plasticizer concentrations between any of said first polymer melt, said second polymer melt, and said third polymer melt is 10 phr or more.

7. The method of claim 1, wherein the difference in phr of the plasticizer concentrations between any of said first polymer melt, said second polymer melt, and said third polymer melt is 15 phr or more.

8. The method of claim 1, wherein the difference in phr of the plasticizer concentrations between any of said first polymer melt, said second polymer melt, and said third polymer melt is 20 phr or more.

9. The method of claim 1, wherein said second polymer layer has a residual hydroxyl content by weight that is at least 2.5% greater that the residual hydroxyl content by weight in each of said first polymer layer and said third polymer layer.

10. The method of claim 1, wherein said second polymer layer has a residual hydroxyl content by weight that is at least 3.0% greater that the residual hydroxyl content by weight in each of said first polymer layer and said third polymer layer.

11. The method of claim 1, wherein said second polymer layer has a residual hydroxyl content by weight that is at least 4.0% greater that the residual hydroxyl content by weight in each of said first polymer layer and said third polymer layer.

12. The method of claim 1, wherein said second polymer layer has a residual hydroxyl content by weight that is at least 5.0% greater that the residual hydroxyl content by weight in each of said first polymer layer and said third polymer layer.

13. The method of claim 1, wherein the amount of plasticizer in each of said first and said third polymer melts is from 10 75 phr, and the amount of plasticizer in said second polymer melt is from greater than 0 to 50 phr.

14. The method of claim 1, wherein the first polymer melt and the third polymer melt have the same composition.

15. The method of claim 1, wherein the first polymer melt and the third polymer melt have the different compositions.

16. The method of claim 1, further comprising a fourth polymer layer comprising a polymer melt comprising poly (vinyl butyral) and a plasticizer, wherein the fourth polymer layer is disposed between the first polymer layer and the third polymer layer.

* * * * *